United States Patent
Ramesh et al.

(10) Patent No.: US 8,098,623 B2
(45) Date of Patent: Jan. 17, 2012

(54) TELECOMMUNICATIONS FRAME STRUCTURE ACCOMODATING DIFFERING FORMATS

(75) Inventors: Rajaram Ramesh, Raleigh, NC (US); Kumar Balachandran, Cary, NC (US); Havish Koorapaty, Cary, NC (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 824 days.

(21) Appl. No.: 12/138,000

(22) Filed: Jun. 12, 2008

(65) Prior Publication Data
US 2009/0092085 A1 Apr. 9, 2009

Related U.S. Application Data

(60) Provisional application No. 60/986,062, filed on Nov. 7, 2007, provisional application No. 60/960,550, filed on Oct. 3, 2007.

(51) Int. Cl.
*H04W 4/00* (2009.01)

(52) U.S. Cl. ...... 370/329; 370/341; 370/85.7; 370/95.1; 370/437; 370/431; 455/34.1; 455/34.2; 455/199.1

(58) Field of Classification Search .................. 370/329, 370/341, 85.7, 431, 95.1, 437; 455/34.1, 455/34.2, 199.1
See application file for complete search history.

(56) References Cited

U.S. PATENT DOCUMENTS

| | | | |
|---|---|---|---|
| 5,946,634 A | 8/1999 | Korpela | |
| 2004/0081131 A1 | 4/2004 | Walton et al. | |
| 2005/0063345 A1 | 3/2005 | Wu et al. | |
| 2006/0018279 A1 | 1/2006 | Agrawal et al. | |
| 2006/0092892 A1 | 5/2006 | Trachewsky | |
| 2006/0274852 A1 | 12/2006 | Trachewsky | |
| 2007/0040703 A1 | 2/2007 | Akkarakaran et al. | |

(Continued)

FOREIGN PATENT DOCUMENTS

EP 1 622 290 7/2005

(Continued)

OTHER PUBLICATIONS

Supplementary EP Search Report mailed Nov. 24, 2010 in EP application 08847468.9.

(Continued)

*Primary Examiner* — Jeffrey Pwu
*Assistant Examiner* — Abdelnabi Musa
(74) *Attorney, Agent, or Firm* — Nixon & Vanderhye, P.C.

(57) ABSTRACT

A radio access network (RAN) (20) comprise a base station (28) and a wireless terminal (30). The base station 28 comprises a transceiver (38) and a frame handler (40), the wireless terminal (30) comprises a transceiver (48) and a wireless terminal frame handler (50). The frame handlers (40, 50) handle a enhanced frame F having enhanced frame structure. At least a downlink portion of the frame is formatted and handled in a manner whereby the frame can be perceived as a first format type of frame if the wireless terminal is a first type of wireless terminal and perceived as an enhanced or second format type of frame if the wireless terminal is a second type of wireless terminal. The frame handler configures the frame as plural subframes, each subframe having a downlink burst followed by an uplink burst. The frame is preferably configured to afford the second type of wireless terminal sufficient time to develop an acknowledgement for a message transmitted in a downlink burst, the acknowledgement being sent to the base station in an uplink burst which is within one frame length of the message.

25 Claims, 8 Drawing Sheets

U.S. PATENT DOCUMENTS

| | | | |
|---|---|---|---|
| 2007/0064728 A1 | 3/2007 | Nitta et al. | |
| 2007/0133388 A1 | 6/2007 | Lee et al. | |
| 2007/0230416 A1* | 10/2007 | Harris et al. | 370/338 |
| 2007/0286127 A1 | 12/2007 | Inohiza | |
| 2008/0151809 A1* | 6/2008 | Chindapol et al. | 370/315 |
| 2008/0165881 A1* | 7/2008 | Tao et al. | 375/267 |
| 2008/0232401 A1 | 9/2008 | Ahmadi et al. | |
| 2009/0116425 A1* | 5/2009 | Lim et al. | 370/328 |
| 2009/0116435 A1 | 5/2009 | Koorapaty et al. | |
| 2009/0122771 A1 | 5/2009 | Cai | |
| 2009/0131110 A1 | 5/2009 | Balachandran et al. | |
| 2009/0161616 A1 | 6/2009 | Ramesh et al. | |
| 2009/0185476 A1 | 7/2009 | Tsai et al. | |
| 2009/0201860 A1* | 8/2009 | Sherman et al. | 370/329 |

FOREIGN PATENT DOCUMENTS

| | | |
|---|---|---|
| EP | 1 798 883 A | 6/2007 |
| EP | 2 019 528 A | 1/2009 |
| EP | 2 026 616 A | 2/2009 |
| WO | 2005/109705 A | 11/2005 |
| WO | 2008/049028 | 4/2008 |
| WO | 2009/023808 A | 2/2009 |

OTHER PUBLICATIONS

Cudak et al, "Draft IEEE802.16m requirements", IEEE C802.16M-07/076, [Online] Mar. 5, 2007, pp. 1-146, XP002507326.

3GPP TS 36.300 V8.2.0 (Sep. 2007) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TS 36.211 V8.0.0 (Sep. 2007) Technical Specification 3rd Generation Partnership Project; Technical Specification Group Radio Access Network; Evolved Universal Terrestrial Radio Access (E-UTRA); Physical channels and modulation (Release 8).

Koorapaty, Backward Compatible Use of Large Bandwidths for 802.16m, IEEE 802.16 Broadband Wireless Access Working Group <http://ieee802.org/16>. Jan. 16, 2008.

PCT International Preliminary Report on Patentability, dated Feb. 4, 2010 in PCT/SE2008/050922.

U.S. Final Office Action mailed Feb. 3, 2011 in U.S. Appl. No. 12/354,159.

U.S. Office Action mailed Aug. 2, 2010 in U.S. Appl. No. 12/354,159.

Ryu et al, "IEEE 802..16m Requirements on Legacy Support", Feb. 23, 2007, retrieved from the Internet URL: wireless.org/tgm/contrib./C80216m-07_037.pdf.

Chang et al, "CDMA Code Partitioning for a R-UL Ranging Control", Jan. 8, 2007, retrieved from the Internet URL: wireless.org/relay/contrib./C80216j-07_128.pdf.

Jeon et al "Dedicated Ranging Opportunity for RS", Mar. 5, 2007, retrieved from the Internet URL: wireless.org/relay/contrib./C80216j-07_175.pdf.

U.S. Office Action mailed Jun. 27, 2011 in U.S. Appl. No. 12/170,579.

U.S. Office Action mailed May 11, 2011 in U.S. Appl. No. 12/259,068.

International Search Report mailed May 20, 2009 in PCT Application No. PCT/SE2008/051451.

Boone et al, "Strategies for Fast Scanning and Handovers in WiMax/802.16", Aug. 2008.

Kim, "IEEE 802.16/WiMax Security", 2007.

* cited by examiner

TELECOMMUNICATIONS FRAME STRUCTURE ACCOMODATING DIFFERING FORMATS

This application claims the priority and benefit of U.S. Provisional Patent Application 60/960,550, entitled "A New Frame Structure For 802.16m", filed Oct. 3, 2007, and U.S. Provisional Patent Application 60/986,062, entitled "Backwards Compatible Implementation of SC-FDMA Uplink in WiMAX", filed Nov. 7, 2007, both of which are incorporated herein by reference in their entirety.

BACKGROUND

I. Technical Field

This invention relates to telecommunications, and particularly to the structure of frames transmitted over a wireless or radio interface.

II. Related Art and Other Considerations

In a typical cellular radio system, wireless terminals (also known as mobile terminals, mobile stations, and mobile user equipment units (UEs)) communicate via base stations of a radio access network (RAN) to one or more core networks. The wireless terminals (WT) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. The base station, e.g., a radio base station (RBS), is in some networks also called "NodeB" or "B node". The base stations communicate over the air interface (e.g., radio frequencies) with the wireless terminals which are within range of the base stations. The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network providing wideband code division multiple access for user equipment units (UEs). The radio access network in a UMTS network covers a geographical area which is divided into cells, each cell being served by a base station. Base stations may be connected to other elements in a UMTS type network such as a radio network controller (RNC). The Third Generation Partnership Project (3GPP or "3G") has undertaken to evolve further the predecessor technologies, e.g., GSM-based and/or second generation ("2G") radio access network technologies.

The IEEE 802.16 Working Group on Broadband Wireless Access Standards develops formal specifications for the global deployment of broadband Wireless Metropolitan Area Networks. Although the 802.16 family of standards is officially called WirelessMAN, it has been dubbed WiMAX" (from "Worldwide Interoperability for Microwave Access") by an industry group called the WiMAX Forum.

IEEE 802.16e-2005 (formerly known as IEEE 802.16e) is in the lineage of the specification family and addresses mobility by implementing, e.g., a number of enhancements including better support for Quality of Service and the use of Scalable OFDMA. In general, the 802.16 standards essentially standardize two aspects of the air interface—the physical layer (PHY) and the Media Access Control layer (MAC).

Concerning the physical layer, IEEE 802.16e uses scalable OFDMA to carry data, supporting channel bandwidths of between 1.25 MHz and 20 MHz, with up to 2048 sub-carriers. IEEE 802.16e supports adaptive modulation and coding, so that in conditions of good signal, a highly efficient 64 QAM coding scheme is used, whereas where the signal is poorer, a more robust BPSK coding mechanism is used. In intermediate conditions, 16 QAM and QPSK can also be employed. Other physical layer features include support for Multiple-in Multiple-out (MIMO) antennas in order to provide good performance in NLOS (Non-line-of-sight) environments and Hybrid automatic repeat request (HARQ) for good error correction performance.

In terms of Media Access Control layer (MAC), the IEEE 802.16e encompasses a number of convergence sublayers which describe how wireline technologies such as Ethernet, ATM and IP are encapsulated on the air interface, and how data is classified, etc. It also describes how secure communications are delivered, by using secure key exchange during authentication, and encryption during data transfer. Further features of the MAC layer include power saving mechanisms (using Sleep Mode and Idle Mode) and handover mechanisms.

The IEEE standard 802.16m is intended to be an evolution of IEEE standard 802.16e with the aim of higher data rates and lower latency. There is a requirement for backward compatibility between IEEE standard 802.16m and its IEEE standard 802.16e predecessor. Yet the frame structure of IEEE standard 802.16e poses problems for backward compatibility, as explained below.

Figure 1:
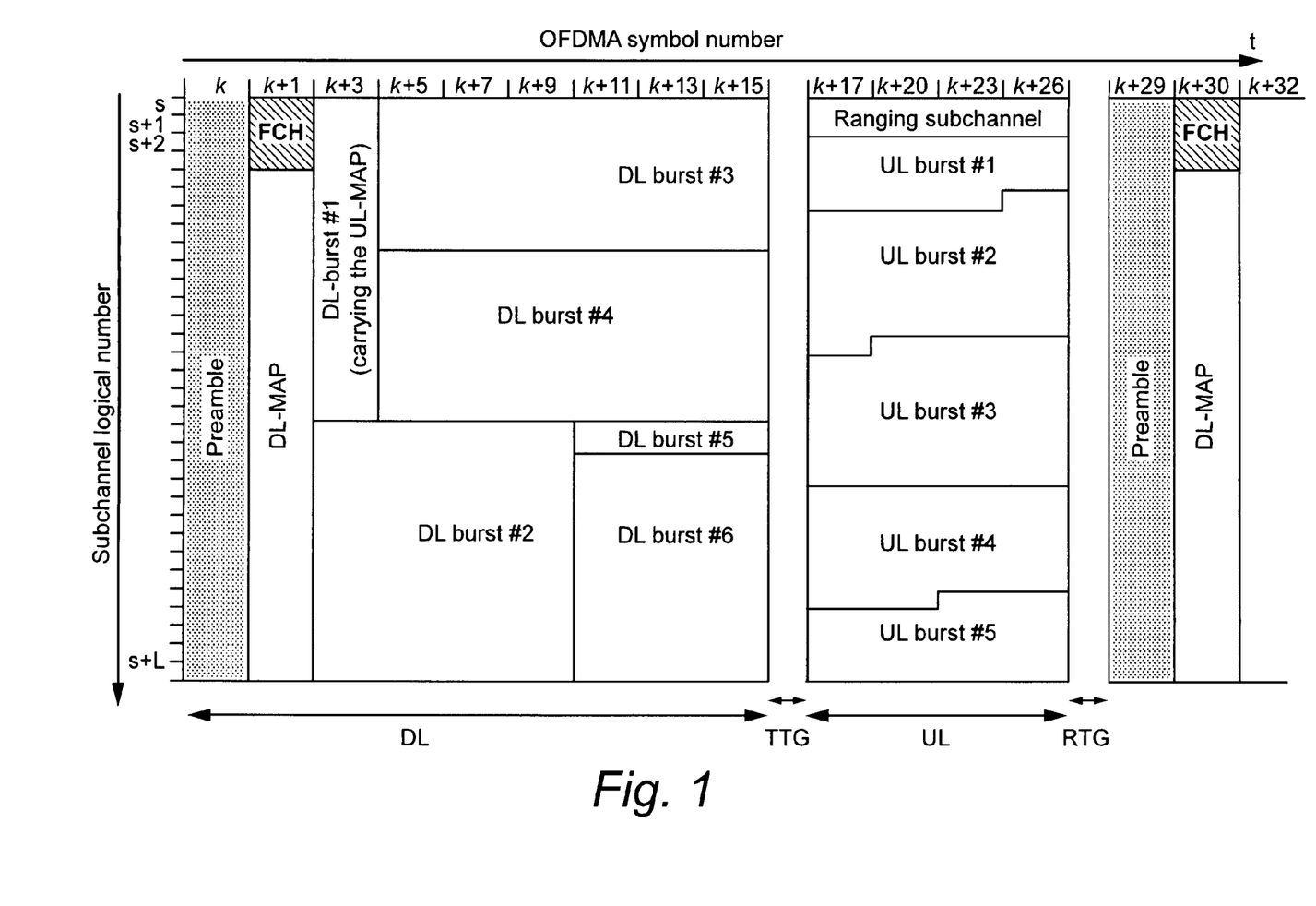
FIG. 1 is a diagrammatic view of frame structure for IEEE standard 802.16e.

The frame structure for IEEE standard 802.16e is shown in FIG. 1. The frame length for IEEE standard 802.16e is 5 ms, and uses time division multiplexing (TDD). The preamble is used by mobile stations to synchronize to the downlink (DL), and the DL-MAP messages that occur just following the preamble give allocation information to the mobile stations on the downlink and the uplink. Examples of downlink and uplink allocations are shown in FIG. 1. The transmit transition gap (TTG) and the receive transition gap (RTG) are gaps used for the mobile station to switch from receive to transmit and vice versa.

Figure 2A:
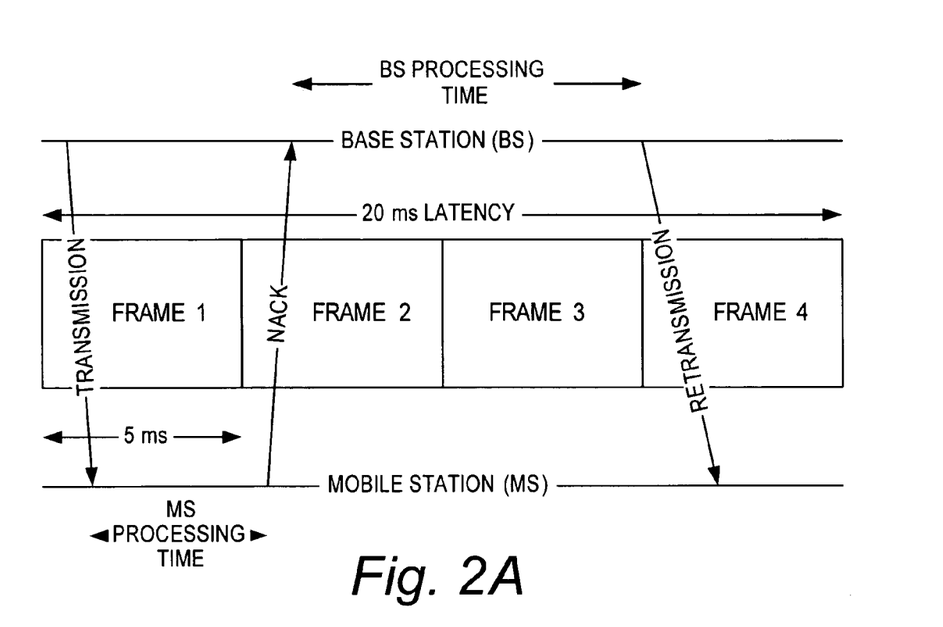
FIG. 2A is a diagrammatic view illustrating the latency of retransmissions for an example conventional wireless network.

In IEEE standard 802.16e, the desired latency for a transmission on the downlink (DL) and a single retransmission is 20 milliseconds. Thus, as illustrated in FIG. 2, a base station can send a data block (transmission) in Frame 1, and the mobile station (MS) can send a negative acknowledgement (NACK) in Frame 2, allowing for processing delay at the mobile station (MS). With processing and scheduling delay at the base station, a retransmission can be sent in Frame 4, which is within the 20 ms delay budget.

Figure 2B:
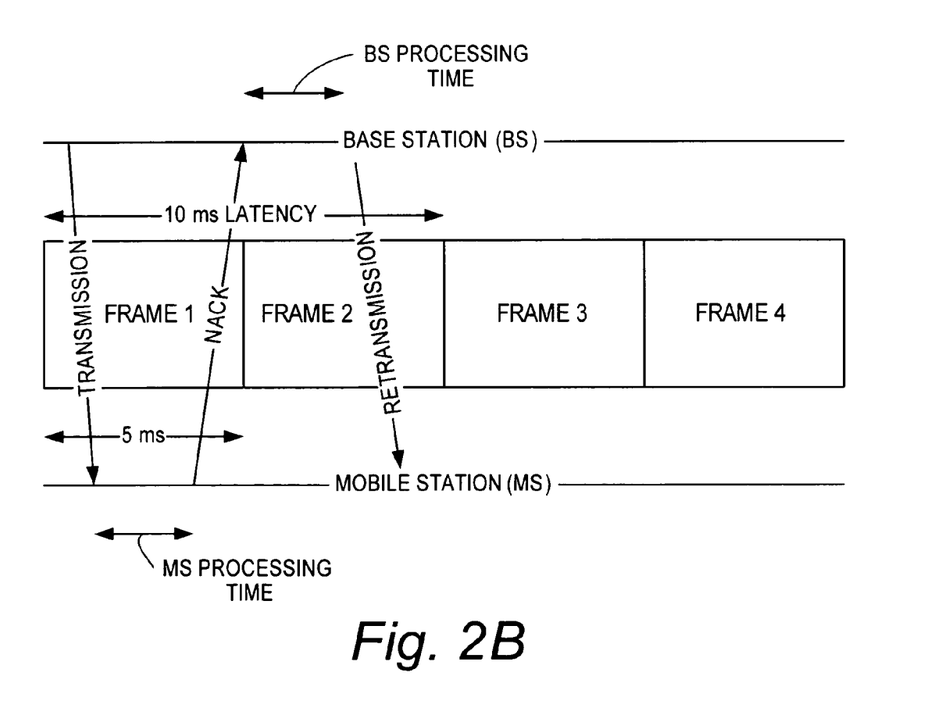
FIG. 2B is a diagrammatic view illustrating the latency of retransmissions according to an example wireless network of the present technology.

For IEEE standard 802.16m, on the other hand, a latency of 10 ms is desirable on the downlink (DL). As shown in FIG. 2B, this means that the retransmission has to be sent in the very next frame after a transmission. This is only possible if the NACK is sent by the mobile station (MS) in the same frame, and the base station reacts immediately to the NACK to send the retransmission. This shorter latency imposes a significant processing burden on the base station (to process, e.g., the NACK and generate the re-transmission) and the mobile station (MS) (to determine if a NACK is necessary and to generate the NACK). In addition, flexibility of allocation may be lost. For example, it may be absolutely necessary for the allocation to the mobile station (MS) to be in the beginning of the first fame so that the mobile station (MS) has sufficient time to react. Also, the downlink (DL)-uplink (UL) ratio (DL:UL) cannot be too high, otherwise the base station will have too little time to process the NACK and to send the retransmission.

There is also an additional requirement or desire in 802.16m to enhance the throughput of the system at high vehicular speeds. Wireless data systems typically use a process of link adaptation to adjust the transmit signal format to a mobile station based on its instantaneous channel conditions in order to optimize the throughput of the wireless link. Such link adaptation is typically based on feedback of channel quality information from the MS, which is typically sent once per frame. With high vehicular speeds, the channel changes more rapidly, and the feedback information sent from the MS may be outdated.

It would be advantageous to have a shorter frame length in order to meet the desired latency for IEEE standard 802.16m, while at the same time preserving the flexibility of allocation. The shorter frame length would also allow the feedback of channel quality information at a higher rates, thereby facilitating the improvement of data throughputs at high vehicular speeds. However, legacy mobile stations (including, for example, mobile stations subscribing to IEEE standard 802.16e) may not be able to operate with a smaller frame length.

SUMMARY

An enhanced frame structure comprises a legacy frame (e.g., a 5 ms OFDMA frame) divided into subframes of smaller size (e.g., shorter length). The subframes can serve as the effective frame size for new mobiles, while a legacy mobile station (MS) can transparently operate on the 5 ms frame size. Aspects of the technology include a base station comprising a frame handler which formats a downlink (DL) portion(s) and receives an uplink (UL) portion(s) of the frame; a wireless terminal which receives the downlink (DL) portion(s) and formats uplink (UL) portion(s) of the frame; a radio access network (RAN) which encompasses both the base station and the wireless terminal; and a method of operating such radio access network (RAN).

Thus, one aspect of the technology pertains to a base station of a radio access network comprising a frame handler and a transceiver. The transceiver is involved in communicating a frame of information over an air interface with a wireless terminal participating in a connection with the base station. The frame handler formats or configures at least a downlink portion of the frame in a manner whereby the frame can be perceived as a first format type of frame if the wireless terminal is a first type of wireless terminal and perceived as an enhanced frame if the wireless terminal is a second type of wireless terminal. The frame handler configures the frame as plural subframes (e.g., two, three, four or more subframes), each subframe having a downlink burst followed by an uplink burst.

In an example embodiment, the frame is preferably configured to afford the second type of wireless terminal sufficient time to develop an acknowledgement for a message transmitted in a downlink burst of an earlier subframe of the frame and to transmit the acknowledgement to the base station in a subframe that is typically within one frame length of the downlink burst of the message. The acknowledgement can be transmitted in an uplink burst of the same frame or a succeeding subframe in a different frame. For example, the frame handler of the base station is preferably arranged to configure the frame to afford the second type of wireless terminal sufficient time to transmit the acknowledgement to the base station in an uplink burst of a non-first subframe (e.g., last subframe) of the frame in a situation such as when the message to be acknowledged is in a first or early subframe of the frame. In an example implementation wherein the frame comprises two subframes, the non-first subframe of the frame is a second subframe of the frame. In a situation in which a downlink message occurs in other than a first subframe of the frame, the frame handler of the base station is preferably arranged to configure the frame so that the second type of wireless terminal can transmit the acknowledgement to the base station in an uplink burst of a succeeding subframe, which could be in a different frame. In either case, at least in part due to the subframe structure of the frame, the second type of wireless terminal can transmit the acknowledgement to the base station within one frame length of receipt of the downlink message which is to be acknowledged.

In an example embodiment, the frame carries OFDMA symbols and has a length of 5 milliseconds.

In an example embodiment, the frame handler of the base station configures the frame to permit the first type of wireless terminal to utilize the downlink burst of one subframe (e.g., the first subframe) and an uplink burst of another (e.g., a subsequent) subframe of the frame.

In an example embodiment, the frame handler of the base station configures an uplink burst of the first subframe and a downlink burst of a second subframe to be perceived by the first type of wireless terminal as downlink transmissions non-germane to the connection. As a variation of this embodiment, the downlink burst of the second subframe can also be used for transmissions to the first type of wireless terminal.

In an example embodiment, the first subframe of the frame as configured by the frame handler comprises a specification message which specifies a parameter useful for interpreting structure of the frame, e.g., the parameter specifies a timing of an event relative to an uplink burst of a non-first subframe of the frame. As a first example, the specification message can comprise an uplink allocation message such as the UL-MAP message used in IEEE standard 802.16e, and the parameter is a start time parameter which specifies a start time of the uplink burst of the non-first subframe. As a variation/enhancement of the first example, the frame handler is configured to further include in the downlink burst of the subframe a start time parameter perceivable by the second type of wireless terminal and which specifies a start time of the uplink burst of the first subframe. As a second example, the specification message can comprise a directed transmission to the wireless terminal or a broadcast message in the cell, such as a Downlink Channel Descriptor (DCD) message used in IEEE standard 802.16e, and the parameter can comprise one or both of (1) a transmission time gap which precedes the uplink burst of the non-first subframe; (2) a receive time gap which follows the uplink burst of the non-first subframe. As a variation/enhancement of the second example, the frame handler of the base station is configured to further include in the downlink burst of the subframe one or both of (1) a transmission time gap which precedes the uplink burst of the first subframe; (2) a receive time gap which follows the uplink burst of the first subframe.

Another aspect of the technology pertains to a wireless terminal which participates in a connection with a base station of a radio access network. The wireless terminal comprises a transceiver (configured for communicating a frame over an air interface with the base station) and a frame handler. The frame handler is arranged to receive a downlink burst of the frame and to determine from the downlink burst that the frame comprises plural subframes (each subframe comprising a downlink burst followed by an uplink burst).

The wireless terminal further comprises an acknowledgement handler configured to develop an acknowledgement to the base station for a message transmitted in a downlink burst of a subframe of the frame whereby the frame handler can include the acknowledgement in an uplink burst of the same frame or an uplink burst of a subframe which succeeds the frame and is exemplarily within a frame length of the message.

In an example embodiment, the frame handler is arranged to include the acknowledgement in an uplink burst of a non-first subframe of the frame. In an example implementation, the non-first subframe of the frame is a second subframe of the frame.

In an example embodiment, an early subframe (e.g., the first subframe) of the frame comprises a specification message which specifies a parameter. The frame handler of the wireless terminal is arranged to use the parameter for determining a timing of an event relative to an uplink burst of a non-first subframe of the frame. As one example, the specification message can comprise an uplink allocation message such as the UL-MAP message used in IEEE standard 802.16e, and the format handler of the wireless terminal is arranged to use the parameter to determine a start time of the uplink burst of the non-first subframe. As a variation or enhancement of this first example, the frame handler of the wireless terminal can be configured to further ascertain from the downlink burst of the subframe another start time parameter and to use the another start time parameter to determine a start time of the uplink burst of the first subframe. As a second example, the specification message can comprise a directed transmission to the wireless terminal or a broadcast message in the cell, such as a Downlink Channel Descriptor (DCD) message used in IEEE standard 802.16e, and the frame handler of the wireless terminal is arranged to use the parameter to determine one or both of (1) a transmission time gap which precedes the uplink burst of the non-first subframe; (2) a receive time gap which follows the uplink burst of the non-first subframe. As a variation/enhancement to this second example, the frame handler of the wireless terminal can be arranged to further ascertain from the downlink burst of the subframe a further parameter, and to use the further parameter to determine one or both of (1) a transmission time gap which precedes the uplink burst of the first subframe; (2) a receive time gap which follows the uplink burst of the first subframe.

In another aspect of the technology, the second type wireless terminal transmits channel quality information on plural uplink subframes in any frame. A wireless terminal of the first kind would only transmit channel quality information on the uplink burst of the last subframe in a frame.

Another aspect of the technology pertains to a method of operating a radio access network comprising a base station which communicates over a radio interface with plural types of wireless terminals using frames of information. The method comprises formatting at least a downlink portion of the frames in a manner whereby the frames can be perceived as a first format type of frame by a first type of wireless terminal and perceived as an enhanced or second format types of frame by a second type of wireless terminal. The frames are formatted or configured as plural subframes, each subframe having a downlink burst followed by an uplink burst.

In an example mode, the method further comprises, at the second type of wireless terminal, receiving a message in a frame pertaining to the second type of wireless terminal and including an acknowledgement in an uplink burst of a subframe that is exemplarily within one frame length of the message, e.g., in a subframe of the same frame in the case that the downlink message occurs relatively early in the frame or in a subframe of a successive frame in the case that the downlink message occurs relatively late in the frame.

In an example mode and embodiment, the method further comprises configuring or formatting the frame to afford the second type of wireless terminal receiving a message in a first downlink sub-frame sufficient time to transmit the acknowledgement to the base station in an uplink burst of a non-first subframe of the frame (e.g., in some implementations a last subframe of the frame). In an example implementation, the last subframe of the frame is a second subframe of the frame.

In an example mode and embodiment, the method further comprises the first type of wireless terminal disregarding an uplink burst of the first subframe and a downlink burst of a second subframe as downlink transmissions non-germane to the connection. In a further exemplary embodiment, the method comprises the first type of wireless terminal receiving downlink data on the downlink burst of the second subframe while treating the uplink burst of the first subframe as downlink transmissions non-germane to the connection. This method further comprises the configuration of the duration of the gaps in the frame to be an integer number of symbol durations.

In an example mode and embodiment, the method further comprises, including in the first subframe of the frames a specification message which specifies a parameter; and using the parameter for interpreting structure of the frame, the parameter specifying a timing of an event relative to an uplink burst of a non-first subframe of the frame. In a first example mode, the specification message can comprise an uplink allocation message (e.g., a UL-MAP message) and the parameter is a start time parameter which specifies a start time of the uplink burst of the non-first subframe. A variation or enhancement of this first example can further comprise including in the downlink burst of the subframe a further start time parameter and the second type of wireless terminal using the further start time parameter as a start time of the uplink burst of the first subframe. In a second example mode, the specification message can comprise a directed transmission to the wireless terminal or a broadcast message in the cell (e.g., a DCD message), and the parameter can comprise one or both of (1) a transmission time gap which precedes the uplink burst of the non-first subframe; (2) a receive time gap which follows the uplink burst of the non-first subframe. A variation or enhancement of this second example comprises including in the downlink burst of the subframe one or both of (1) a transmission time gap which precedes the uplink burst of the first subframe; (2) a receive time gap which follows the uplink burst of the first subframe.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 3:
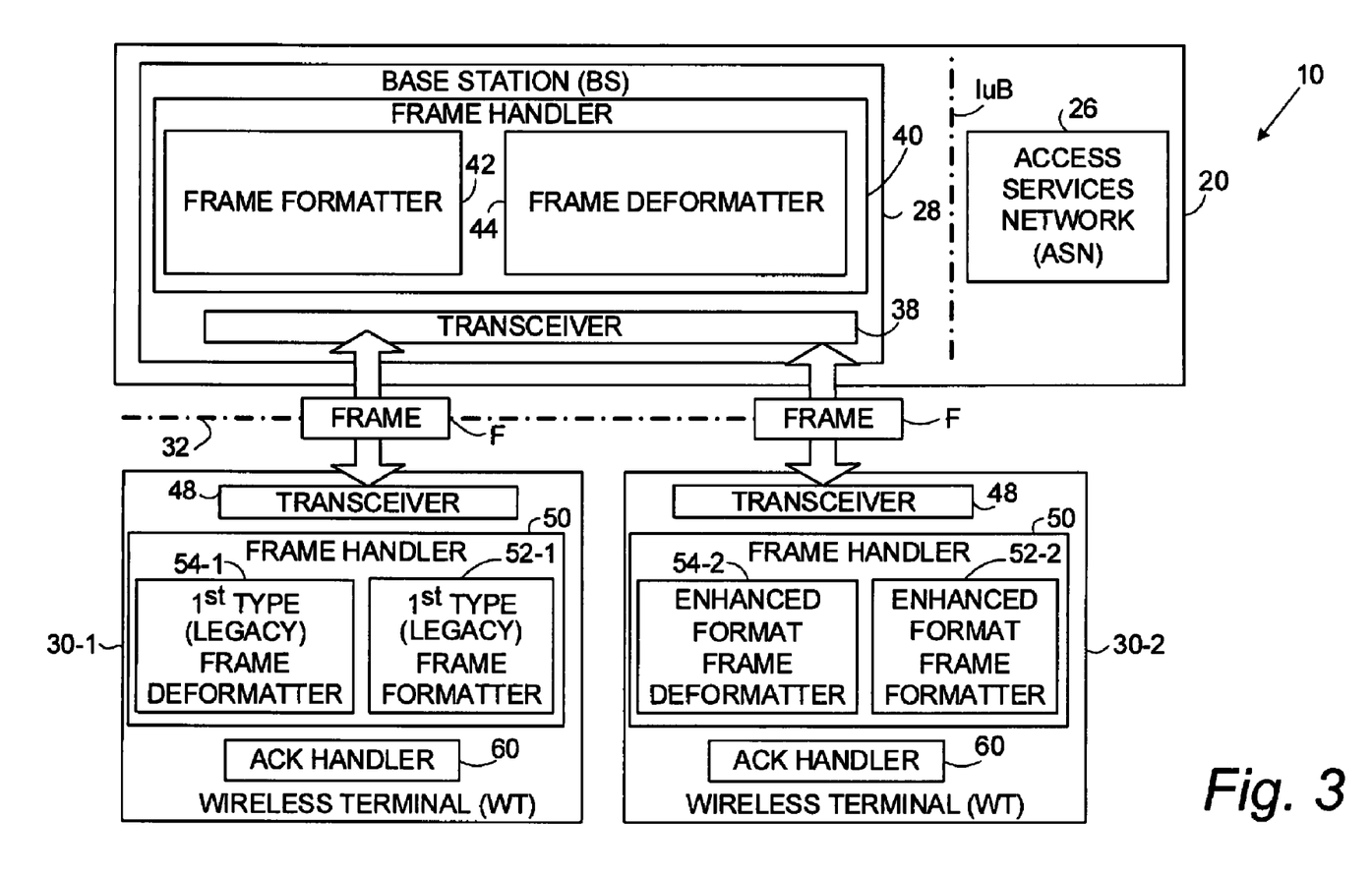
FIG. 3 is a schematic view of an example telecommunications system which serves as an example suitable environment for implementation of an enhanced frame structure of FIG. 4.

The technology described herein is advantageously illustrated in the example, non-limiting, context of a telecommunications system 10 such as that schematically depicted in FIG. 3. The example telecommunications system 10 of FIG. 3 shows a radio access network 20 which can be connected to one or more external (e.g., core) networks. The external networks may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., an Access Services Network (ASN) Gateway node working in conjunction with one or more Core Services Network (CSN) components.

The radio access network (RAN) 20 includes one or more Access Services Network (ASN) nodes 26 and one or more radio base stations (RBS) 28. For sake of simplicity, the radio access network (RAN) 20 of FIG. 3 is shown with only one ASN node ASN 26 and one base station node (BS) 28. Typically each ASN 26 is connected to one or more base stations (BS) 28, but the number of nodes is not necessarily germane to the present technology. Those skilled in the art will also appreciate that a base station is sometimes also referred to in the art as a radio base station, a node B, eNodeB 28, or B-node (all of which are used interchangeably herein).

As shown in FIG. 3, a wireless terminal (WT) 30 communicates with one or more cells or one or more base stations (BS) 28 over a radio or air interface 32. In differing implementations, the wireless terminal (WT) 30 can be known by different names, such as mobile terminal, mobile station or MS, user equipment unit (UE), handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc.

As shown in FIG. 3, in an example embodiment base station 28 comprises transceiver 38 and frame handler 40. Transceiver 38 is involved in communicating enhanced frame (s) of information (illustrated as frames F in FIG. 3) over an air interface with wireless terminals participating in respective connections with the base station. The transceiver 38 includes both a transmitter(s) for transmitting downlink (DL) portions or bursts of frames, as well as a receiver(s) for receiving uplink (UL) portions or bursts of frames. As used herein, "transceiver" can include one or more transceivers and further encompasses radio transmission and/or reception equipment suitable for transmitting/receiving a data stream or the like in the form of plural sub-carriers or subchannels (such as in OFDMA and SC-FDMA, for non-limiting examples), including plural antennas when appropriate The frame handler 40 is involved in processing frame(s) F which are communicated between base station 28 and wireless terminal (WT) 30. More detailed aspects of structure and composition of the frames F are discussed subsequently. Since in this technology the frame(s) have both downlink (DL) portions or bursts and uplink (UL) portions or bursts, the frame handler 40 in turn comprises frame formatter 42 (which facilitates preparation of the downlink (DL) bursts prior to transmission by transceiver 38) and frame deformatter 44 (which facilitates processing of the uplink (UL) bursts as received by transceiver 38 from wireless terminal (WT) 30). In an example embodiment, frame handler 40, as well as its frame formatter 42 and deformatter 44, can be realized by one or more processors or controllers as those terms are herein expansively explained.

For sake of simplicity, FIG. 3 does not show other well-known functionalities and/or units of base station 28, such as (by way of non-limiting example) interfaces to other nodes of the radio access network (RAN); queues through which data is collected or assembled preparatory to inclusion in the downlink (DL) bursts configured by frame formatter 42; generators or processors for preparing signaling information for inclusion in the downlink (DL) bursts configured by frame formatter 42; queues into which data obtained from uplink (UL) bursts are stored after processed by deformatter 44; units of base station 28 which utilize the data and/or signaling included in uplink (UL) bursts; or node processors or the like which supervise or coordinate the constituent units or functionalities of base station 28.

FIG. 3 happens to illustrate two wireless terminals, e.g., wireless terminal (WT) 30-1 and wireless terminal (WT) 30-2. As explained by way of examples hereinafter, the wireless terminal (WT) 30-1 is referenced herein as a first type of wireless terminal in the sense that it tends to attempt to recognize and process the enhanced frame F as being of a legacy or first format type. The wireless terminal (WT) 30-2, on the other hand, is referenced herein as a second type of wireless terminal in the sense that it can recognize and process the enhanced frame as having an "enhanced" or second format type. In other words, wireless terminal (WT) 30-2 can recognize the frame according to its actual structure, whereas wireless terminals (WT) 30-2 processes the enhanced frame F according to a presumed legacy structure (which is not inconsistent with the enhanced frame structure).

FIG. 3 thus shows example implementations of wireless terminals, (e.g., wireless terminal (WT) 30-1 and wireless terminal (WT) 30-2) which participate in respective connections with base station 28. Despite being of differing types, in a generic sense wireless terminal (WT) 30-1 and wireless terminal (WT) 30-2 both comprise transceiver 48 and wireless terminal frame handler 50. Transceiver 48 is configured for communicating frames F over air interface 32 with base station 28, and comprises a receiver for receiving downlink (DL) bursts of the frames from base station 28 and a transmitter for transmitting uplink (UL) bursts of the frames to base station 28. Again for sake of simplicity, FIG. 3 does not show other well-known functionalities and/or units of wireless terminal (WT) 30-1 and wireless terminal (WT) 30-2, such as (by way of non-exhaustive example) processors or the like which execute one or more applications at the wireless terminals (WT). It will be appreciated, however, that wireless terminal frame handler 50 including one or more of its wireless terminal frame formatter 52 and wireless terminal deformatter 54 can be realized by processor(s) or controller(s) as those terms are herein expansively described.

As mentioned above, the wireless terminal (WT) 30-1 is a first type of wireless terminal (e.g., a legacy wireless terminal) and recognizes and processes the enhanced frame F as being of a legacy or first format type. To this end, frame handler 50 of wireless terminal (WT) 30-1 comprises a first format type frame formatter 52-1 and first format type deformatter 54. Wireless terminal frame formatter 52 serves, e.g., to prepare uplink (UL) bursts of the frames prior to transmission to base station 28 by transceiver 48. Wireless terminal deformatter 54 serves, e.g., to process downlink (DL) bursts received by transceiver 48 over air interface 32 from base station 28. In being "first format type" both frame formatter 52 and deformatter 54 are configured to operate according to a predesignated frame format, e.g., a legacy frame format.

FIG. 3 shows wireless terminal (WT) 30-1 communicating/exchanging a frame F with base station 28 over air interface 32.

By contrast, wireless terminal (WT) 30-2 is a second type of wireless terminal which, because of enhancements or advancements (for example), can operate in accordance with a second or enhanced format type of frame. To this end, frame deformatter 54-2 of wireless terminal (WT) 30-2 is an enhanced type frame deformatter capable of recognizing and processing a received enhanced frame according to its actual frame format and structure, as described herein. Similarly, frame formatter 54-2 of wireless terminal (WT) 30-2 is an enhanced type frame formatter which is capable, e.g., of preparing uplink portions of frames in accordance with the enhanced format.

Returning to base station 28, frame formatter 42 formats or configures at least a downlink portion of the frame F in a manner whereby the frame can be perceived as a first format type of frame if the wireless terminal is a first type of wireless terminal and perceived as an enhanced or second format type of frame if the wireless terminal is a second type of wireless terminal. For example, the first type of wireless terminal can be a legacy wireless terminal 30-1 which is suitable for an earlier standard or protocol (such as IEEE standard 802.16e, by way of non-exhaustive example), while the second type of wireless terminal 30-2 can be a newer or upgraded wireless terminal which is configured to accommodate or utilize the a newer standard or protocol (such as IEEE standard 802.16m, by way of non-exhaustive example) having an enhanced frame structure of frame F as herein described with reference, e.g., to FIG. 4.

Frame handler 40 configures enhanced frame F as plural subframes, each subframe having a downlink burst followed by an uplink burst. The enhanced frame F is configured to afford the second type of wireless terminal 30-2 sufficient time to develop an acknowledgement for a message transmitted in a downlink burst of a first subframe of the frame and to transmit the acknowledgement to the base station 28 in an uplink burst of the frame. If a message is transmitted in a downlink burst of a non-first subframe of the frame, the wireless terminal (WT) 30-2 can generate an acknowledgement which is transmitted in an uplink burst of another frame (e.g., a successive frame).

At wireless terminal (WT) 30 the wireless terminal frame formatter 52 formats or configures uplink (UL) bursts or portions of the frame F. If wireless terminal (WT) 30-1 is the first type (e.g., legacy type) of wireless terminal, the frame is formatted or configured by wireless terminal frame formatter 52-1 for transmission on the uplink (UL) as a legacy frame. On the other hand, if wireless terminal is a newer or upgraded wireless terminal 30-2, the frame is formatted or configured by wireless terminal frame formatter 52-2 for transmission on the uplink (UL) to have an enhanced frame structure such as shown by way of example in FIG. 4.

If wireless terminal is a second type wireless terminal 30-2, wireless terminal deformatter 54-2 receives a downlink burst of enhanced frame F and determines from the downlink burst that enhanced frame F comprises plural subframes (each subframe having a downlink burst followed by an uplink burst). The wireless terminal 30-2 further comprises acknowledgement handler 60 configured to develop an acknowledgement to base station 28 for a message transmitted in a downlink burst. Wireless terminal frame handler 50 can include the acknowledgement in an uplink burst of a subframe which is within one frame length of the acknowledged downlink message. For example, the acknowledgement can be included in an uplink burst of the same frame if the acknowledgement message is in an early (e.g., first) subframe. Otherwise, the acknowledgement message can be in a subframe of the next frame.

Again for sake of simplicity, FIG. 3 does not show other well-known functionalities and/or units of wireless terminal (WT) 30-1 or wireless terminal (WT) 30-2 (collectively and/or generically referred to as "wireless terminal (WT) 30"), such (by way of non-exhaustive example) as processors or the like which execute one or more applications at wireless terminal (WT) 30. It will be appreciated, however, that wireless terminal frame handler 50 including one or more of its wireless terminal frame formatter 52 and wireless terminal deformatter 54 can be realized by processor(s) or controller(s) as those terms are herein expansively described.

Figure 4:
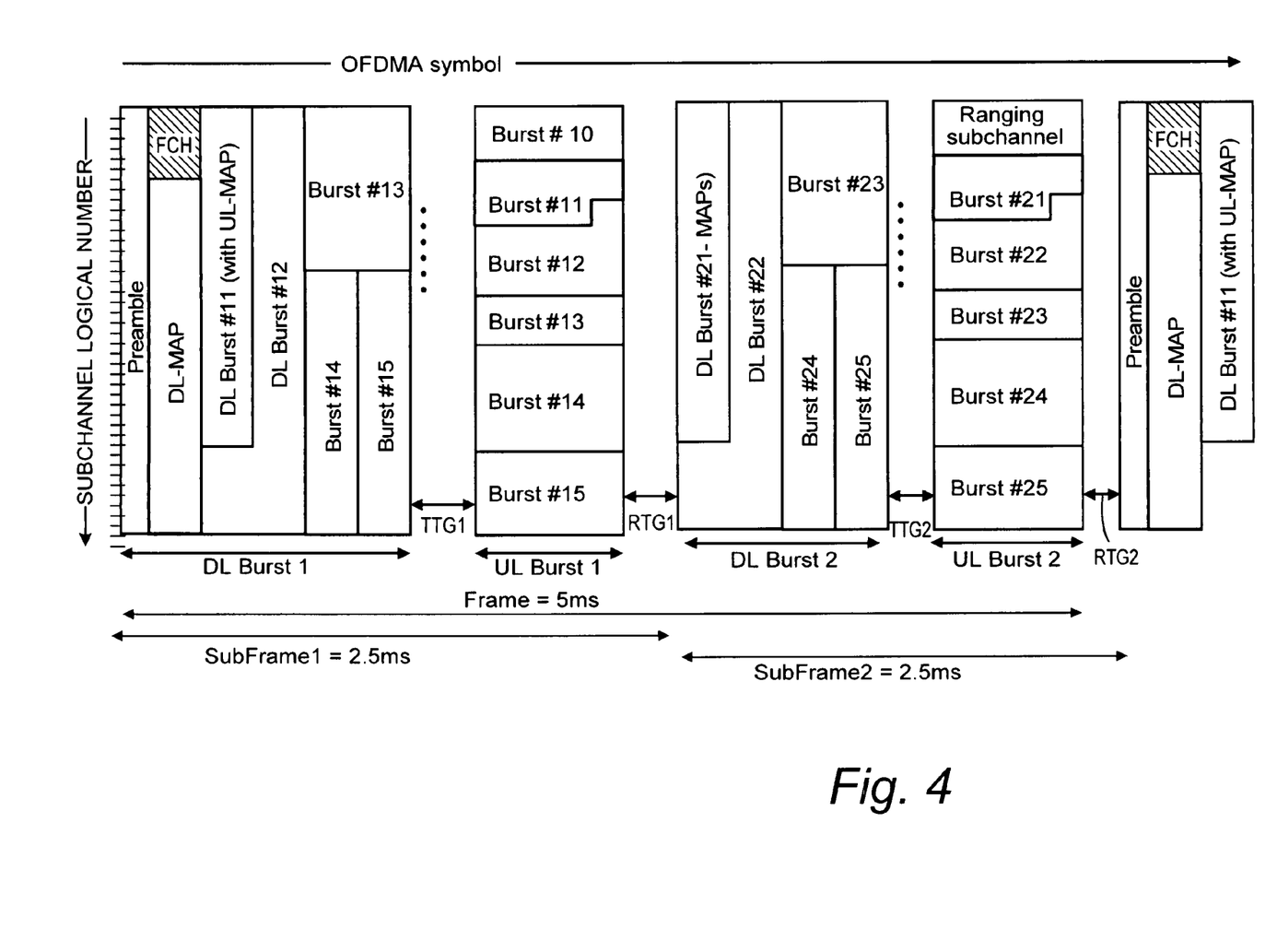
FIG. 4 is a diagrammatic view of enhanced frame structure for an example frame as communicated between a base station and a wireless terminal as perceived by a second type wireless terminal.

FIG. 4 shows an example frame structure for enhanced frame F. In the illustrated example, which is consistent with and particularly but not exclusively suited for IEEE standard 802.16m, the five ms frame of FIG. 4 is divided into two 2.5 ms subframes for the purposes of illustration. Each subframe has a downlink (DL) portion and an uplink (UL) portion, e.g., downlink (DL) Burst 1 and uplink (UL) Burst 1 in subframe 1 and downlink (DL) Burst 2 and uplink (UL) Burst 2 in subframe 2. However, the two subframes need not necessarily be equal. The lengths of the subframes could be configured so that one subframe is longer than the other, though the lengths of both subframes, along with the transmit and receive transition gaps added, sum to 5 ms.

As shown in FIG. 4, the bursts of enhanced frame F are separated by gaps to allow for switching the transceiver from transmit to receive. For example, FIG. 4 illustrates a first transmit transition gap (TTG1) between downlink (DL) Burst 1 of subframe 1 and uplink (UL) Burst 1 of subframe 1; a first receive transition gap (RTG1) between uplink (UL) Burst 1 of subframe 1 and downlink (DL) burst 2 of subframe 2; a second transmit transition gap (TTG2) between downlink (DL) Burst 2 of subframe 2 and uplink (UL) Burst 2 of subframe 2; and a second receive transition gap (RTG2) between uplink (UL) Burst 2 of subframe 2 and a downlink (DL) burst 1 of the first subframe of a next frame. The presence of the TTGs helps prevent uplink (UL) interference from downlink (DL) transmissions from remote base stations.

FIG. 4 further shows that a preamble need not necessarily be present in the downlink (DL) part of subframe 2. Nor is the ranging subchannel present in the uplink (UL) part of subframe 1. These functionalities are present in downlink (DL) Burst 1 and uplink (UL) Burst 2, and need not be repeated in downlink (DL) Burst2 and uplink (UL) Burst 1, but can be optionally included.

Figure 5:
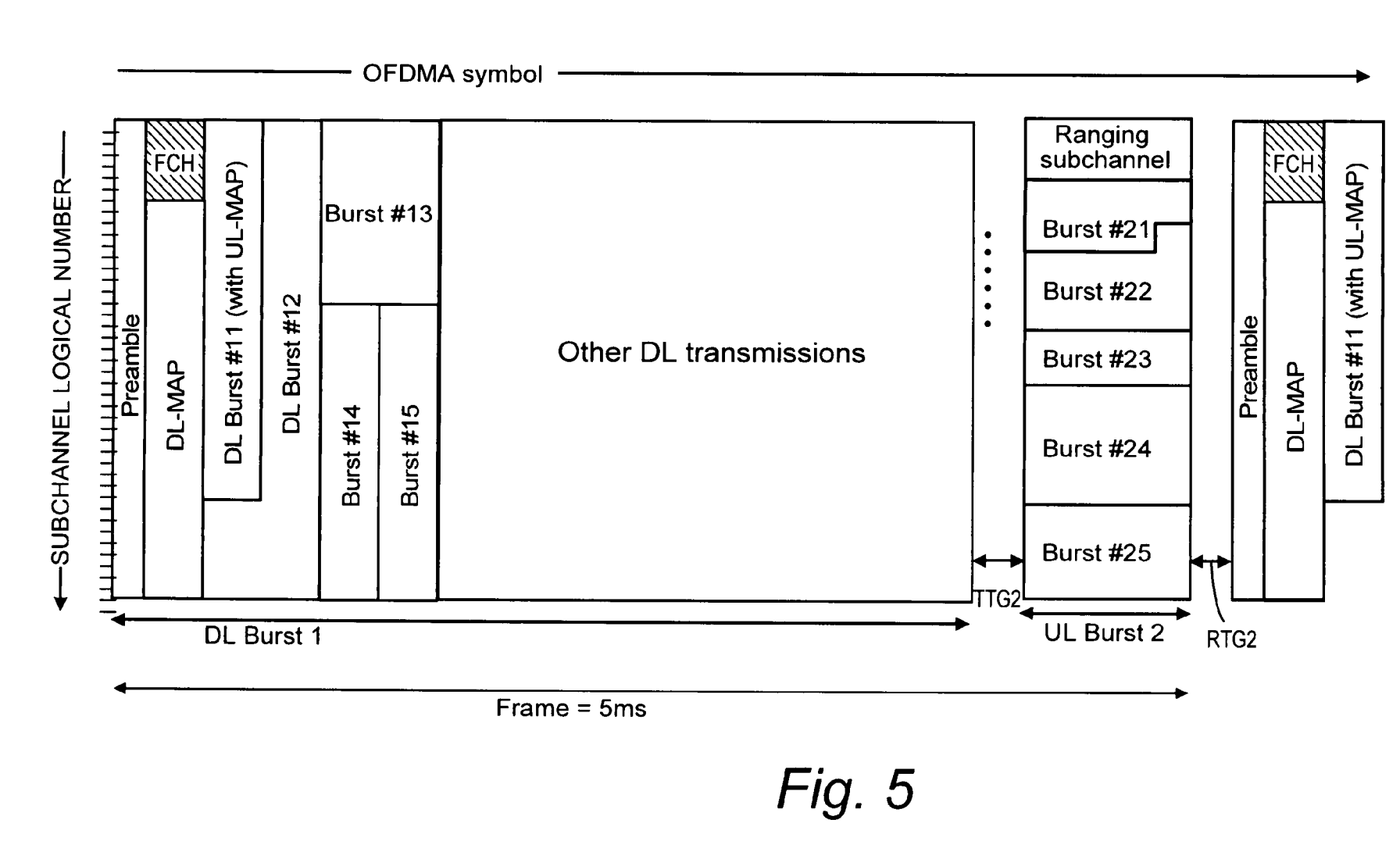
FIG. 5 is a diagrammatic view of enhanced frame structure for an example frame as perceived by a first type wireless terminal.

FIG. 5 shows how the frame structure of FIG. 4 appears to a wireless terminal (WT) 30-1 of the first type, e.g., to a legacy wireless terminal. The part of the frame between downlink (DL) Burst 1 and uplink (UL) Burst 2 will not be assigned to any legacy wireless terminals, and will appear as other downlink (DL) transmissions. Optionally, the wireless terminal 30-1 of the first type may be assigned allocations in both DL Burst 1 and DL Burst 2 but not in the part of the frame used for UL Burst 1. Typically, these may be seen as downlink (DL) transmissions using a zone that is not supported by the wireless terminals. Support for multiple zones exists in IEEE standard 802.16e.

Figure 6A:
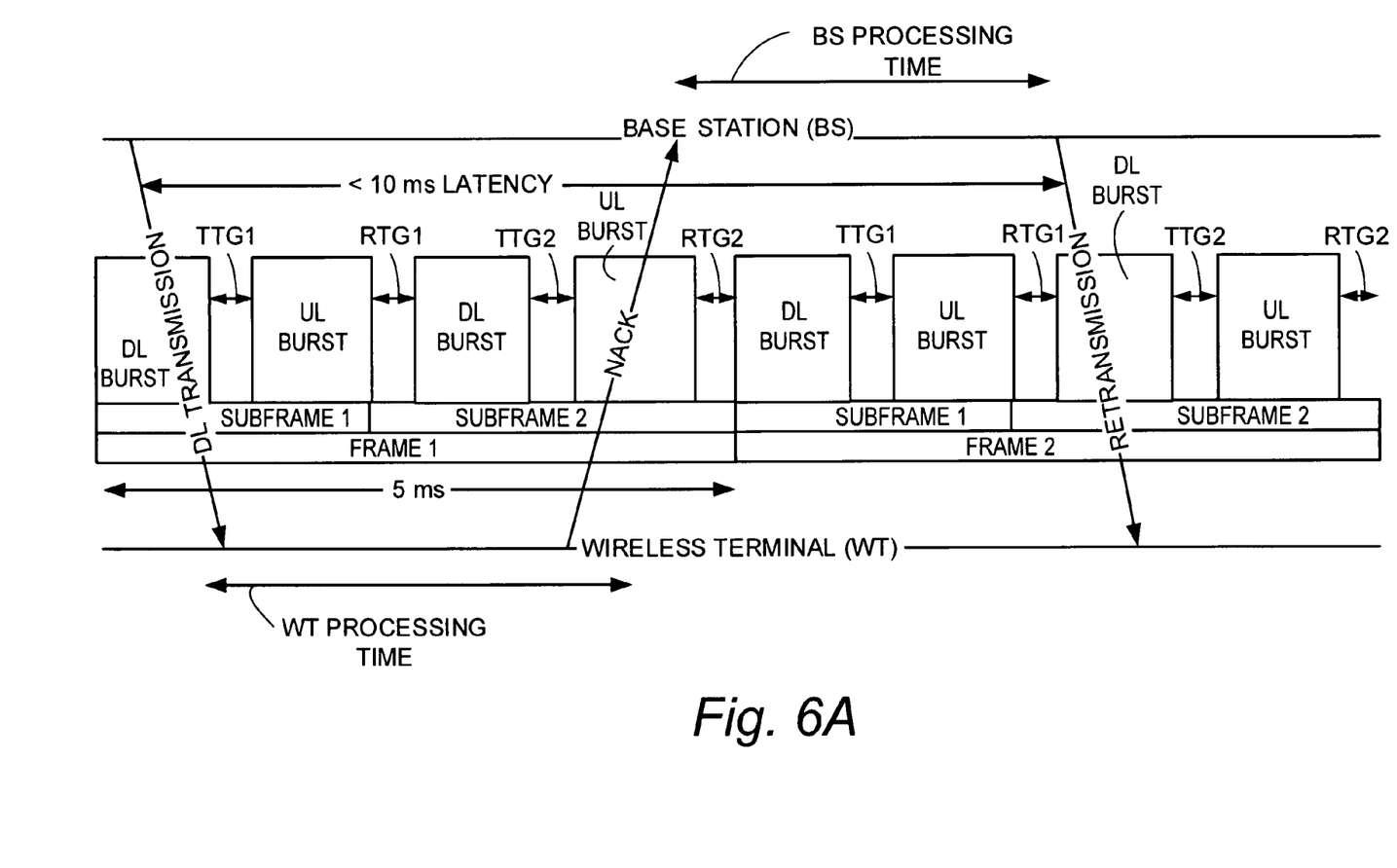
FIG. 6A is a diagrammatic view illustrating the concept of latency when utilizing an enhanced frame structure such as that of FIG. 4 in accordance with a first case in which a DL message is received in an early part of a frame.

With enhanced structure of enhanced frame F such as that illustrated by FIG. 4, and as shown in FIG. 6, a new wireless terminal 30-2 can receive a downlink (DL) transmission in downlink (DL) Burst 1 of subframe 1, send an ACK in uplink (UL) Burst 2 of subframe 2, and receive a retransmission in downlink (DL) Burst 2 of subframe 2 of the next frame. This mode of operation allows for sufficient processing time at each node along with full flexibility of allocation, and still meets the desired latency of 10 ms for new wireless terminals. The frame structure is transparent to first type wireless terminals 30-1 (e.g., legacy wireless terminals), which can operate essentially the same as previously (e.g., as in IEEE standard 802.16e, as a non-limiting example).

Figure 7:
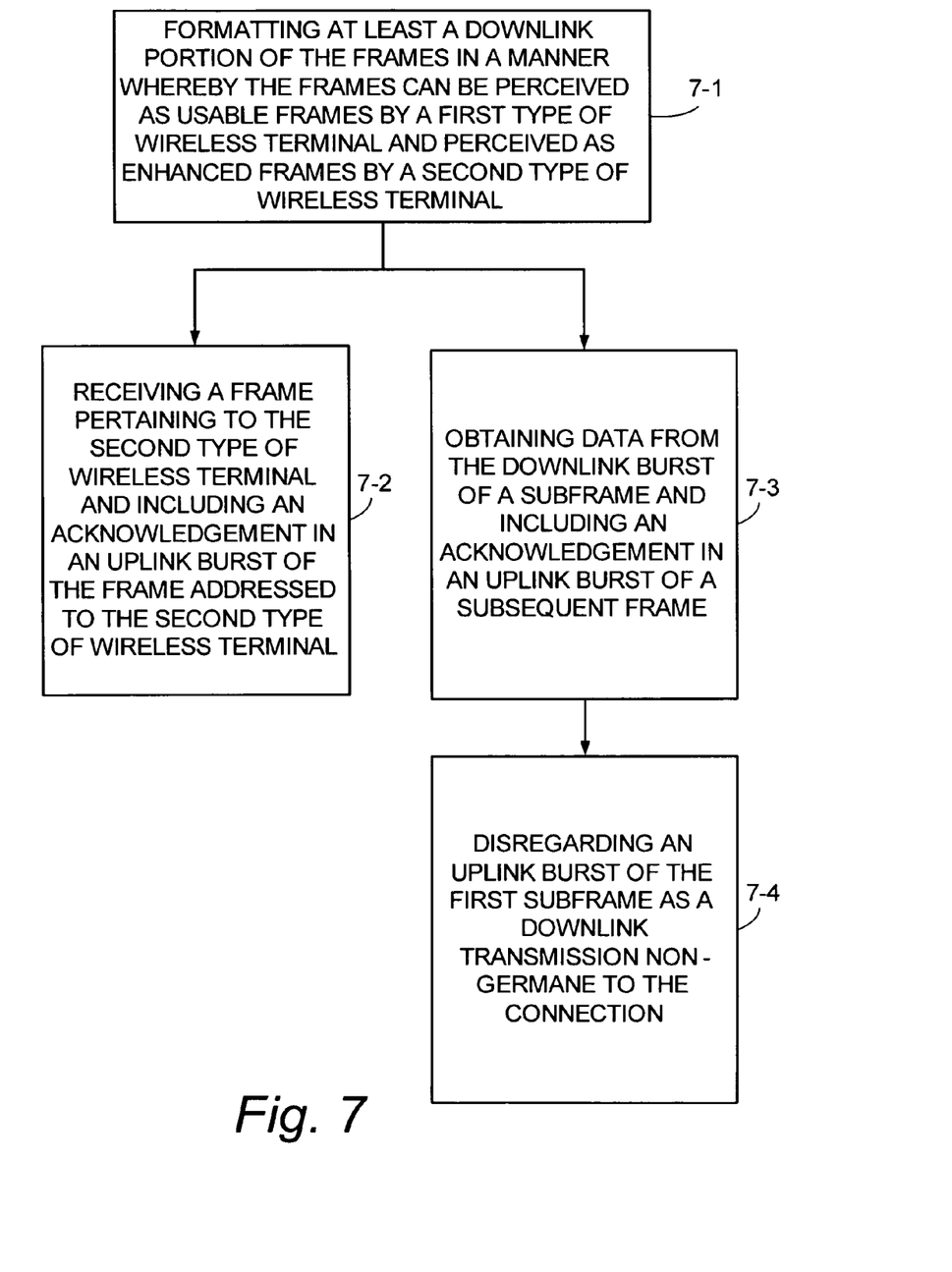
FIG. 7 is a flowchart depicting basic, representative, non-limiting acts or steps involved in operating a radio access network which utilizes the enhanced frame structure of an enhanced frame F such as that of FIG. 4.

FIG. 7 depicts basic, representative, non-limiting acts or steps involved in operating a radio access network which utilizes the enhanced frame structure of an enhanced frame F such as that of FIG. 4. FIG. 7 thus illustrates acts of a method of operating a radio access network comprising a base station which communicates over a radio interface with plural types of wireless terminals using frames of information.

As indicated in FIG. 7, act 7-1 comprises formatting at least a downlink portion of the frames in a manner whereby the frames can be perceived as first format type of frames by a first type of wireless terminal 30-1 and perceived as enhanced frames by a second type of wireless terminal 30-2. As explained above with reference to, e.g., FIG. 4, the frames (such as enhanced frame F) are formatted or configured as plural subframes, each subframe having a downlink burst followed by an uplink burst.

Act 7-2 is performed if the wireless terminal is a second type wireless terminal 30-2. Act 7-2 comprises the second type of wireless terminal 30-2 receiving a message in a frame pertaining to the second type of wireless terminal 30-2 and including an acknowledgement in an uplink burst of a subframe which is within one frame length of the downlink message.

In this regard, FIG. 6A illustrates the second type of wireless terminal 30-2 receiving a message in a downlink burst of a first subframe of the frame addressed to the second type of wireless terminal 30-2, as illustrated in FIG. 6A. As explained previously, the enhanced frame F is configured or formatted in such a case to afford the second type of wireless terminal 30-2 sufficient time to transmit the acknowledgement to the base station in an uplink burst of a non-first subframe of the same frame (e.g., a last subframe in some example embodiments). In an example implementation illustrated in FIG. 4, the non-first subframe of the frame is a second and last subframe of the frame. The base station can then perform a retransmission (e.g., in the second DL burst of the second subframe of the next frame, e.g., Frame 2, and still be within the desired latency (e.g., under 10 ms latency).

Figure 6B:
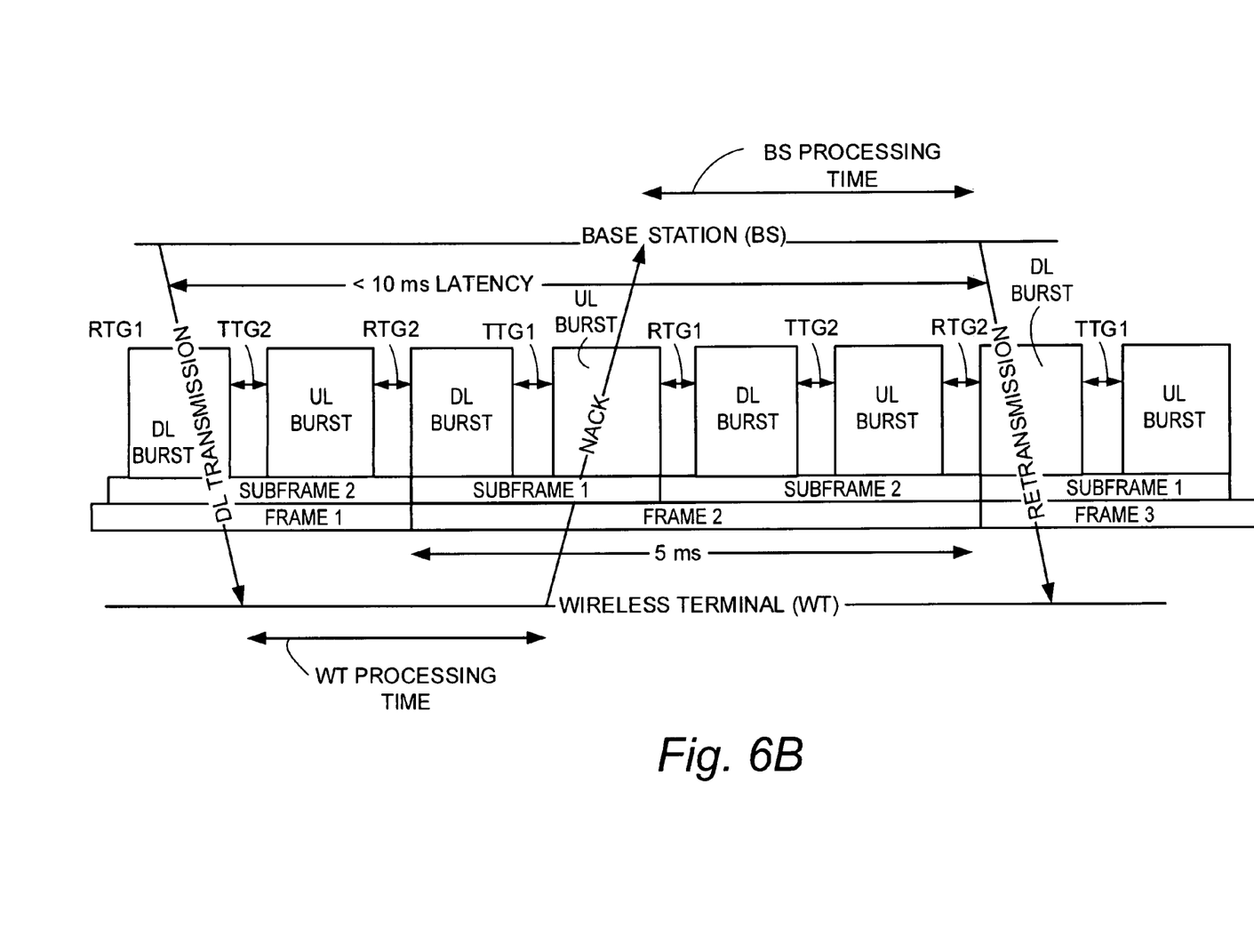
FIG. 6B is a diagrammatic view illustrating the concept of latency when utilizing an enhanced frame structure such as that of FIG. 4 in accordance with a second case in which a DL message is received in a late part of a frame.

In the case of FIG. 6B, on the other hand, the DL message is sent in the DL burst of the second subframe of Frame 1. Accordingly, in the case of FIG. 6B, the wireless terminal (WT) 30-2 can prepare an acknowledgement to the base station in an uplink burst of the first subframe of the next frame, e.g., of Frame 2. The base station can prepare and perform a retransmission of the original DL message, e.g., in the DL burst of the second subframe of Frame 2 or even in the DL burst of the first subframe of Frame 3 (not shown), and still be within the desired latency period.

Act 7-3 is performed if the wireless terminal is a first type wireless terminal 30-1 (e.g., a legacy wireless terminal). Act 7-3 comprises the first type of wireless terminal 30-1 obtaining data from the downlink burst of any subframe; and including an acknowledgement in an uplink burst of a subsequent frame. Optionally, and as depicted by act 7-4, the method can further comprise the first type of wireless terminal 30-1 disregarding an uplink burst of the first subframe (and optionally a downlink burst of a second subframe) as a downlink transmission non-germane to the connection.

The Bursts such as the downlink (DL) Bursts and uplink (UL) Bursts of the example enhanced frame F of FIG. 4 actually each comprise a series of "bursts" or "burst fields" or "burst sections", such constituent bursts being referred to by the notation "Burst #n" in FIG. 4, where n is an integer ranging from 11 to 15 in downlink (DL) Burst 1 of subframe 1; n is an integer ranging from 10 to 15 in uplink (UL) Burst 1 of subframe 1; n is an integer ranging from 21 to 25 in downlink (DL) Burst 2 of subframe 2; and n is an integer ranging from 21 to 25 in uplink (UL) Burst 2 of subframe 2. Each burst/burst field/burst section is an allocation of resources in time and frequency to one or more wireless terminals.

The downlink (DL) bursts of the subframes, e.g., of subframe 1 and subframe 2 of enhanced frame F of FIG. 4, can include various messages. Among the messages of the downlink (DL) Bursts are allocation messages such as the MAP messages used in IEEE standard 802.16e, e.g., DL-MAP messages and UL-MAP messages. The "MAP" messages are used to perform downlink (DL) and uplink (UL) allocations to the wireless terminals, e.g., the DL-MAP messages perform downlink (DL) allocations and the UL-MAP messages perform uplink (UL) allocations to the wireless terminals.

The signaling that is done in MAP and other MAC messages (generically referred to herein as "specification messages") is important for the enhanced frame structure of enhanced frame F to work with first type (e.g., legacy) wireless terminals 30-1. Additional signaling, which can include or be implementation by such specification messages, facilitates full exploitation by wireless terminals of features available with the enhanced frame structure of enhanced frame F. In an example embodiment, the first subframe of the frame comprises a specification message which specifies a parameter. The frame handler 50 of the wireless terminal 30 is arranged to use the parameter for determining a timing of an event relative to an uplink burst of a non-first subframe of the frame.

IEEE standard 802.16e defines the start of the uplink (UL) part of the frame using the "Allocation Start Time" information element in the UL-MAP message. With the enhanced frame structure, the UL-MAP sent in subframe 1 can use the same information element (i.e., the "Allocation Start Time" information element) to signal the start of uplink (UL) Burst 2. Legacy wireless terminals are able to act on the allocation, treating uplink (UL) Burst 2 as the uplink (UL) part of the 5 ms frame. New wireless terminals can receive additional information which signals the start of uplink (UL) Burst 1. In an exemplary embodiment, such signaling can be provided in new information elements in the UL-MAP message. Alternately, such signaling information can be encapsulated in a MAC protocol data unit (PDU) and be sent specifically to wireless terminals of the second type. The offset of uplink (UL) Burst 1 from the beginning of subframe 1 may be different from the offset of uplink (UL) Burst 2 from the beginning of subframe 2.

Thus, as one example of a specification message described in the preceding paragraph, the specification message can comprise a UL-MAP message, and the format handler 54 of the wireless terminal is arranged to use the parameter to determine a start time of the uplink burst of the non-first subframe. As a variation or enhancement of this first example, also described in the preceding paragraph, the frame handler 54 of the wireless terminal can be configured to further ascertain from the downlink burst of the subframe another start time parameter and to use the another start time parameter to determine a start time of the uplink burst of the first subframe.

It should be appreciated that the wireless terminal of the second kind (e.g., wireless terminal 30-2) could be used in a wireless network that only supports the functionality corresponding to the legacy frame structure. In this case, the wireless terminal determines that the network is operating in a mode not capable of the new frame structure, and interprets the messages in accordance to what a legacy terminal would do. Thus, the wireless terminal 30-2 of the second kind interprets the Allocation Start Time message as the start of the single UL Burst when it is connected to a network operating in the legacy mode, and interprets the Allocation Start Time as the start of UL Burst 2 when it is connected to a network operating in the new mode.

The TTG and RTG in IEEE standard 802.16e are signaled in the DCD message. The DCD message is sent on the downlink subframe with a low periodicity, e.g., once in 100 frames or so, and contains configuration information for the downlink channel like descriptions of the modulation and coding schemes used, and the TTG and RTG values. The same values can be used to signal the values of TTG2 and RTG2 to the first type (e.g., legacy) wireless terminals. Since the first type wireless terminals treat these values as the legacy TTG and RTG, the operation is transparent and the legacy frame structure is followed. Additional signaling can be utilized to send the values of TTG1 and RTG1 to new wireless terminals 30-2. This additional information can, for example, be provided using new information elements in the DCD message.

Thus, as a second example of a specification message, the specification message can comprise directed transmission to the wireless terminal or a broadcast message in the cell, such as a Downlink Channel Descriptor (DCD) message used in IEEE standard 802.16e, and the frame handler of the wireless terminal is arranged to use the parameter to determine one or both of (1) a transmission time gap which precedes the uplink burst of the non-first subframe; (2) a receive time gap which follows the uplink burst of the non-first subframe. As a variation/enhancement to this second example, the frame handler of the wireless terminal can be arranged to further ascertain from the downlink burst of the subframe a further parameter, and to use the further parameter to determine one or both of (1) a transmission time gap which precedes the uplink burst of the first subframe; (2) a receive time gap which follows the uplink burst of the first subframe.

A new DL-MAP message can be sent in downlink (DL) Burst 2. This new DL-MAP message can exploit the advanced reception capabilities of a new wireless terminal and thus can be sent in a more efficient fashion than the normal DL-MAP. For example, the new wireless terminals may all be required to support reception of the DL-MAP transmitted using a signal format utilizing multiple antennas that is not supported by legacy terminals. A separate DL-MAP message is also the way in which a separate zone is treated in IEEE standard 802.16e.

As a variation or enhancement, a separate uplink allocation message, e.g., an UL-MAP message, can advantageously be used in the second subframe to allocate uplink resources for new wireless terminals in uplink (UL) Burst 1 or uplink (UL) Burst 2, whereas legacy users are restricted to be allocated in uplink (UL) Burst 2, and the allocation has to be sent in DL Burst 1. New terminals 30-2 can receive an allocation in a new UL-MAP message that is sent in DL Burst 2, and can exploit the advanced reception capabilities of the new terminals. However, new terminals 30-2 can receive uplink allocations in DL Burst 1 also. For new terminals (not new users entering the system) the length, the modulation and coding scheme, and the repetition scheme for the new DL-MAP message in downlink (DL) Burst 2 can be sent as part of the DL-MAP in downlink (DL) Burst 1. Alternatively, a new FCH message can be embedded in downlink (DL) Burst2. An additional preamble may help in CQI estimation also.

An information element known as the 'Zone-Switch IE' is sent in the legacy system to signal to wireless terminals the use of a zone with a different transmission format. A similar message may need to be sent in order for proper operation of legacy wireless terminals 30-1 when confronted with an unknown format, e.g., when they encounter uplink (UL) Burst 1 and downlink (DL) Burst 2.

It is also conceivable that a first type (e.g., legacy) wireless terminal 30-1 can be allocated downlink (DL) data in the downlink (DL) Burst 2. For this to be possible, the sum of TTG1 and RTG1 must be equal to an integral number of symbols. The DL-MAP can allocate a data region by specifying a symbol offset from the preamble location, a subchannel offset and an allocation size. If the sum of TTG1 and RTG1 is equal to an integral number of symbols, then a first type (e.g., legacy) wireless terminal can act on the allocation and receive downlink (DL) data in downlink (DL) Burst 2 also. The implication of this, however, is that downlink (DL) Burst 2 may not exactly start at a 2.5 ms subframe boundary. However, starting exactly at a 2.5 ms subframe boundary is not absolutely necessary as long as the start of downlink (DL) Burst2 can be effectively signaled to the new wireless terminals. Given the fact that the downlink (DL) Burst 1 always starts on 5 ms boundaries, and the start of the uplink (UL) Burst 2 is explicitly signaled in the UL-MAP message even to the legacy wireless terminals, there is really no need for the system to signal TTG and RTG in the IEEE standard 802.16e. Thus, these values can be advantageously exploited to signal TTG1 and RTG1 values to new wireless terminals 30-2.

In another aspect of the current technology, the base station 28 can also command the new wireless terminals 30-2 to send channel quality information in UL Burst 1 and UL Burst 2. The wireless terminal can respond by sending such channel quality information on both UL bursts, which may advantageously be used by the base station to use a transmission format adapted to the current channel conditions reported by the wireless terminal. At the same time, the base station can command the legacy wireless terminals (WT) 30-1 to report channel quality information only on UL Burst 2, since that is the limit of the capability of legacy wireless terminals (WT).

The frames utilized by the technology can have two or more subframes. Having more than two subframes allows even lower latency for the new wireless terminals (WT). Although the drawings and description illustrate use of only two subframes, on the basis of the present disclosure the person skilled in the art knows how to provide more than two subframes for suitable embodiments.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A base station of a radio access network comprising:
    a transceiver configured for communicating a frame of information over an air interface with a wireless terminal participating in a connection with the base station;
    a frame handler arranged to format at least a downlink portion of the frame in a manner whereby the frame can be perceived as a first format type frame if the wireless terminal is a first type of wireless terminal and perceived as an enhanced format type frame if the wireless terminal is a second type of wireless terminal, the frame handler being arranged to configure the frame as plural subframes, each subframe comprising a downlink burst followed by an uplink burst, the frame being configured to afford the second type of wireless terminal sufficient time to develop an acknowledgement for a message transmitted in a downlink burst of a frame, the acknowledgement being transmitted in a subframe which is within one frame length of the downlink burst of the message.

2. The base station of claim 1, wherein the frame handler is arranged to configure the frame to afford the second type of wireless terminal sufficient time to transmit the acknowledgement to the base station in an uplink burst of a non-first subframe of the frame when the message is transmitted in a downlink burst of a non-last subframe of the same frame.

3. The base station of claim 1, wherein the frame handler is arranged to configure the frame to afford the second type of wireless terminal sufficient time to transmit the acknowledgement to the base station in an uplink burst of a subframe of a next frame when the message is transmitted in a downlink burst of a non-first subframe of the frame.

4. The base station of claim 1, wherein the frame carries OFDMA symbols and has a length of 5 milliseconds.

5. The base station of claim 1, wherein the frame handler is arranged to configure the frame to permit the first type of wireless terminal to utilize the downlink burst of the first subframe and an uplink burst of a subsequent subframe of the frame; and wherein an uplink burst of the first subframe is perceived by the first type of wireless terminal as a downlink transmission non-germane to the connection.

6. The base station of claim 1, wherein the first subframe of the frame comprises a specification message which specifies parameters useful for interpreting structure of the frame, and wherein a parameter specifies a timing of an event relative to an uplink burst of a non-first subframe of the frame.

7. The base station of claim 6, wherein the parameter specifies start of an uplink burst to the first type of wireless terminal and start of a non-first uplink burst to the second type of wireless terminal.

8. The base station of claim 7, wherein the parameters further specify the timing of events relative to the uplink burst of other subframes not specified by the parameter that specifies the timing of an event relative to an uplink burst of a non-first subframe of the frame.

9. A wireless terminal which participates in a connection with a base station of a radio access network, the wireless terminal comprising:
    a transceiver configured for communicating a frame over an air interface with a base station; and, a frame handler arranged to receive a downlink burst of the frame and to determine from the downlink burst that the frame comprises plural subframes, each subframe comprising a downlink burst followed by an uplink burst;

an acknowledgement handler configured to develop an acknowledgement to the base station for a message transmitted in the downlink burst of the frame, the acknowledgement being transmitted in a subframe which is within one frame length of the downlink burst of the message.

10. The wireless terminal of claim 9, wherein the frame handler is arranged to include the acknowledgement in an uplink burst of a non-first subframe of the frame when the message is transmitted in a downlink burst of a non-last subframe of the same frame.

11. The wireless terminal of claim 9, wherein the frame handler is arranged to include the acknowledgement in an uplink burst of a subframe of a next frame when the message is transmitted in a downlink burst of a non-first subframe of the frame.

12. The wireless terminal of claim 9, wherein the frame carries OFDMA symbols and has a length of 5 milliseconds.

13. The wireless terminal of claim 9, wherein the first subframe of the frame comprises a specification message which specifies parameters, and wherein the frame handler is arranged to use a parameter for determining a timing of an event relative to an uplink burst of a non-first subframe of the frame, and other parameters for determining the timing of events relative to the uplink bursts of other subframes of the frame.

14. A method of operating a radio access network comprising a base station which communicates over a radio interface with plural types of wireless terminals using frames of information, the method comprising:

formatting at least a downlink portion of the frames in a manner whereby the frames can be perceived as first format type frames by a first type of wireless terminal and perceived as enhanced format type frames by a second type of wireless terminal, the frames being formatted as plural subframes, each subframe comprising a downlink burst followed by an uplink burst;

at the first type of wireless terminal, receiving a frame addressed to the first type of wireless terminal and processing the frame as if it were a first format type frame;

at the second type of wireless terminal, receiving a frame addressed to the first type of wireless terminal and processing the frame as an enhanced format type frame;

at the second type of wireless terminal, developing an acknowledgement to the base station for a message transmitted in a downlink burst of the frame, and transmitting the acknowledgement in a subframe which is within one frame length of the downlink burst of the message.

15. The method of claim 14, further comprising including the acknowledgement in an uplink burst of a non-first subframe of the frame when the message is transmitted in a downlink burst of a non-last subframe of the same frame.

16. The method of claim 14 further comprising including the acknowledgement in an uplink burst of a subframe of a next frame when the message is transmitted in a downlink burst of a non-first subframe of the frame.

17. The method of claim 14 further comprising configuring the frame to carry OFDMA symbols and to have a length of 5 milliseconds.

18. The method of claim 14 further comprising, at a first type of wireless terminal:

obtaining data from the downlink burst of the first subframe; and including data in an uplink burst of a subsequent subframe of the frame disregarding an uplink burst of the first subframe as a downlink transmission non-germane to the connection.

19. The method of claim 14 further comprising:

including in the first subframe of the frames a specification message which specifies parameters;

using the parameters for interpreting structure of the frame, a parameter specifying a timing of an event relative to an uplink burst of a non-first subframe of the frame, and other parameters specifying the timing of events relative to the uplink bursts of other frames.

20. The method of claim 19 wherein the specification message comprises an uplink allocation message and a parameter is a start time parameter which specifies a start time of the uplink burst of the non-first subframe.

21. The method of claim 20 further comprising:

including in the downlink burst of the subframe a further start time parameter; and the second type of wireless terminal using the further start time parameter as a start time of the uplink burst of the first subframe.

22. The method of claim 19 further comprising:

sending the specification message as a directed transmission to the wireless terminal or a broadcast message wherein the parameter comprises one or both of (1) a transmission time gap which precedes the uplink burst of the non-first subframe; (2) a receive time gap which follows the uplink burst of the non-first subframe; and, including in the downlink burst of the subframe one or both of (1) a transmission time gap which precedes the uplink burst of the first subframe; (2) a receive time gap which follows the uplink burst of the first subframe.

23. The base station of claim 1, wherein for the second type of wireless terminal the downlink burst and the uplink burst of each of the plural subframes carry information between the second type of wireless terminal and the base station.

24. The wireless terminal of claim 9, wherein the downlink burst and the uplink burst of each of the plural subframes carry information between the wireless terminal and the base station.

25. The method of claim 14 wherein for the second type of wireless terminal the downlink burst and the uplink burst of each of the plural subframes carry information between the second type of wireless terminal and the base station.

* * * * *

UNITED STATES PATENT AND TRADEMARK OFFICE
CERTIFICATE OF CORRECTION

PATENT NO. : 8,098,623 B2
APPLICATION NO. : 12/138000
DATED : January 17, 2012
INVENTOR(S) : Ramesh et al.

It is certified that error appears in the above-identified patent and that said Letters Patent is hereby corrected as shown below:

Title Page, Item (73), under "Assignee", in Column 1, Line 2, delete "Stockholm," and insert -- (Publ) Stockholm, --, therefor.

Title Page, Item (57), under "ABSTRACT", in Column 2, Line 2, delete "28" and insert -- (28) --, therefor.

On Title Page 2, Item (56), under "OTHER PUBLICATIONS", in Column 2, Line 13, delete "802..16m" and insert -- 802.16m --, therefor.

In Column 18, Line 1, in Claim 16, delete "14" and insert -- 14, --, therefor.

In Column 18, Line 5, in Claim 17, delete "14" and insert -- 14, --, therefor.

In Column 18, Line 8, in Claim 18, delete "14" and insert -- 14, --, therefor.

In Column 18, Line 16, in Claim 19, delete "14" and insert -- 14, --, therefor.

In Column 18, Line 24, in Claim 20, delete "19" and insert -- 19, --, therefor.

In Column 18, Line 28, in Claim 21, delete "20" and insert -- 20, --, therefor.

In Column 18, Line 34, in Claim 22, delete "19" and insert -- 19, --, therefor.

In Column 18, Line 53, in Claim 25, delete "14" and insert -- 14, --, therefor.

Signed and Sealed this
Fourteenth Day of August, 2012

David J. Kappos
*Director of the United States Patent and Trademark Office*